US012498664B2

(12) United States Patent
Kuwabara et al.

(10) Patent No.: US 12,498,664 B2
(45) Date of Patent: Dec. 16, 2025

(54) INTERMEDIATE TRANSFER UNIT AND IMAGE FORMING APPARATUS

(71) Applicants: Nobuo Kuwabara, Kanagawa (JP); Hiroaki Takagi, Kanagawa (JP)

(72) Inventors: Nobuo Kuwabara, Kanagawa (JP); Hiroaki Takagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/758,326

(22) Filed: Jun. 28, 2024

(65) Prior Publication Data

US 2025/0036070 A1 Jan. 30, 2025

(30) Foreign Application Priority Data

Jul. 25, 2023 (JP) ................................ 2023-120615

(51) Int. Cl.
*G03G 21/16* (2006.01)
*G03G 15/16* (2006.01)

(52) U.S. Cl.
CPC ..... *G03G 21/1638* (2013.01); *G03G 15/1615* (2013.01); *G03G 21/1647* (2013.01); *G03G 21/168* (2013.01); *G03G 2221/1642* (2013.01); *G03G 2221/1675* (2013.01)

(58) Field of Classification Search
CPC ............ G03G 15/161; G03G 15/1615; G03G 21/1638; G03G 21/1647; G03G 21/168; G03G 2221/1642; G03G 2221/1675
See application file for complete search history.

(56) References Cited

U.S. PATENT DOCUMENTS

2009/0080950 A1* 3/2009 Kawano ............ G03G 15/0194 399/313
2014/0167587 A1* 6/2014 Takenaka .......... G03G 21/1647 312/333
2015/0055981 A1* 2/2015 Fujita .................. G03G 21/168 399/121
2024/0118654 A1 4/2024 Kuwabara et al.

FOREIGN PATENT DOCUMENTS

JP 2010-091866 A 4/2010
JP 2011-242632 A 12/2011

* cited by examiner

*Primary Examiner* — Sophia S Chen
(74) *Attorney, Agent, or Firm* — Harness, Dickey & Pierce, P.L.C.

(57) ABSTRACT

An intermediate transfer unit includes an intermediate transfer belt, a housing, a grip, and a cover. The housing supports a plurality of stretching rollers stretching the intermediate transfer belt and has a downstream plate in a pull-out direction of the intermediate transfer unit. The downstream plate is orthogonal to the pull-out direction. The grip is on the downstream plate. The cover covers the downstream plate and has a hole to access the grip.

6 Claims, 12 Drawing Sheets

INTERMEDIATE TRANSFER UNIT AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-120615, filed on Jul. 25, 2023, in the Japan Patent Office, the entire disclosure of which is hereby incorporated by reference herein.

BACKGROUND

Technical Field

Embodiments of the present disclosure relate to an intermediate transfer unit and an image forming apparatus.

Related Art

An intermediate transfer unit is known that includes an intermediate transfer belt and a housing that supports a stretching roller for stretching the intermediate transfer belt, and that is removably attached to a body of an image forming apparatus.

In the intermediate transfer unit described above, a handle serving as a grip to be gripped by an operator when the intermediate transfer unit is pulled out is disposed on a front plate serving as a downstream side plate orthogonal to a pull-out direction on a downstream side in the pull-out direction of a frame serving as the housing.

SUMMARY

In an embodiment of the present disclosure, an intermediate transfer unit includes an intermediate transfer belt, a housing, a grip, and a cover. The housing supports a plurality of stretching rollers stretching the intermediate transfer belt and has a downstream plate in a pull-out direction of the intermediate transfer unit. The downstream plate is orthogonal to the pull-out direction. The grip is on the downstream plate. The cover covers the downstream plate and has a hole to access the grip.

In another embodiment of the present disclosure, an image forming apparatus includes the intermediate transfer unit.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
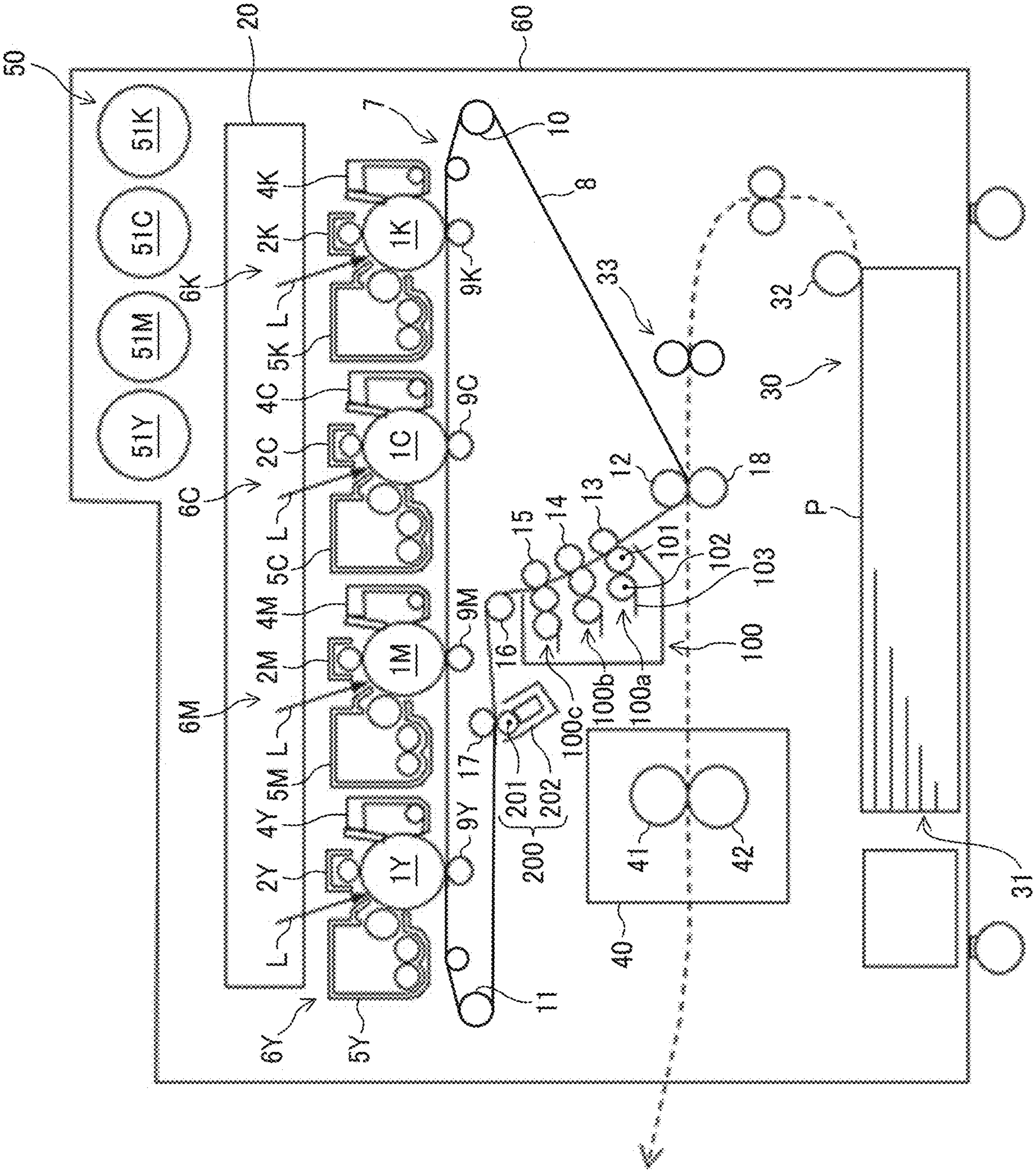
FIG. 1 is a schematic diagram illustrating a configuration of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Descriptions are given below of an intermediate transfer unit and an image forming apparatus, according to embodiments of the present disclosure, with reference to the accompanying drawings. Note that it is easy for a person skilled in the art to modify or amend the present disclosure within the scope of the claims to form another embodiment, and these modifications or amendments are included in the scope of the claims. The following description is an example of the best mode of the present disclosure and does not limit the scope of the claims.

A tandem-type printer (hereinafter, simply referred to as a printer) employing an intermediate transfer method is described below as an image forming apparatus according to an embodiment of the present disclosure. Firstly, a description is given of a basic configuration of a printer 60 serving as an image forming apparatus according to the present embodiment. FIG. 1 is a schematic diagram illustrating a configuration of a printer 60 according to the present embodiment. The printer 60 includes four process units 6Y, 6M, 6C, and 6K for forming yellow, magenta, cyan, and black toner images, respectively.

The four process units 6Y, 6M, 6C, and 6K include drum-shaped photoconductors 1Y, 1M, 1C, and 1K, respectively. Around the photoconductors 1Y, 1M, 1C, and 1K, the process units 6Y, 6M, 6C, and 6K include, for example, charging devices 2Y, 2M, 2C, and 2K, developing devices 5Y, 5C, 5M, and 5K, drum cleaners 4Y, 4M, 4C, and 4K, and charge elimination devices, respectively. Each of the process units 6Y, 6M, 6C, and 6K has the same configuration except that toners of different colors (i.e., yellow (Y), magenta (M), cyan (C), and black (K)) are used.

Above the process units 6Y, 6M, 6C, and 6K, an optical writing unit 20 that irradiates the surfaces of the photoconductors 1Y, 1M, 1C, and 1K with laser beams L to optically write electrostatic latent images thereon is disposed. Below the process units 6Y, 6M, 6C, and 6K, an intermediate transfer unit 7 that serves as a drawer unit and includes an endless intermediate transfer belt 8 serving as a belt member is disposed. The intermediate transfer unit 7 includes, in addition to the intermediate transfer belt 8, for example, multiple stretching rollers disposed inside the loop of the intermediate transfer belt 8, a tension roller 16, a belt cleaner 100, and a lubricant applying device 200.

The multiple stretching rollers inside the loop of the intermediate transfer belt 8 include four primary transfer rollers 9Y, 9M, 9C, and 9K, a driven roller 10, a driving roller 11, a secondary-transfer counter roller 12, three cleaning backup rollers 13, 14, and 15, and an application-brush backup roller 17. The intermediate transfer belt 8 is stretched around a part of circumferential surface of each of the multiple stretching rollers.

Each of the cleaning backup rollers 13, 14, and 15 may not apply a certain tension to the intermediate transfer belt 8 and may be driven to rotate with the rotation of the intermediate transfer belt 8. A driver drives to rotate the driving roller 11 clockwise in FIG. 1, and the rotation of the driving roller 11 rotates the intermediate transfer belt 8 clockwise in FIG. 1.

The four primary transfer rollers 9Y, 9M, 9C, and 9K disposed inside the loop of the intermediate transfer belt 8 interposes the intermediate transfer belt 8 in a space with the photoconductors 1Y, 1M, 1C, and 1K, respectively. In this manner, the outer circumferential surface of the intermediate transfer belt 8 contacts the photoconductors 1Y, 1M, 1C, and 1K to form primary transfer nips for transferring a yellow (Y) toner image, a magenta (M) toner image, a cyan (C) toner image, and a black (K) toner image, respectively. Each of the primary transfer rollers 9Y, 9M, 9C, and 9K is applied with a primary transfer roller bias having a polarity opposite to the normal polarity of the toner from a power supply.

The secondary-transfer counter roller 12 disposed inside the loop of the intermediate transfer belt 8 interposes the intermediate transfer belt 8 in a space with a secondary transfer roller 18 disposed outside the loop of the intermediate transfer belt 8. In this manner, the outer circumferential surface of the intermediate transfer belt 8 contacts the secondary transfer roller 18 to form a secondary transfer nip.

The secondary transfer roller 18 is applied with a secondary transfer bias having a polarity opposite to the normal polarity of the toner from a power supply. Instead of the above-described configuration, the printer 60 may include a sheet conveying belt stretched over the secondary transfer roller 18, several support rollers, and a driving roller, and the secondary transfer roller 18 may interpose the intermediate transfer belt 8 and the sheet conveying belt with the secondary-transfer counter roller 12.

The belt cleaner 100 disposed outside the loop of the intermediate transfer belt 8 includes a pre-cleaner 100*a* for roughly removing toner of an untransferred toner image on the intermediate transfer belt 8. The belt cleaner 100 further includes a normally-charged-toner cleaner 100*b* for removing the toner charged to the normal charge polarity on the intermediate transfer belt 8. The belt cleaner 100 still further includes a reversely-charged-toner cleaner 100*c* for removing toner charged to a polarity (positive polarity) opposite to the normal charge polarity (negative polarity) of the toner on the intermediate transfer belt 8. The above-described order arranging the pre-cleaner 100*a*, the normally-charged-toner cleaner 100*b*, and the reversely-charged-toner cleaner 100*c* in FIG. 1 is merely an example, and the pre-cleaner 100*a*, the reversely-charged-toner cleaner 100*c*, and the normally-charged-toner cleaner 100*b* may be arranged in this order.

Each of the pre-cleaner 100*a*, the normally-charged-toner cleaner 100*b*, and the reversely-charged-toner cleaner 100*c* includes a cleaning brush roller 101, a collection roller 102, and a scraping blade 103. The collection roller 102 collects toner adhering to the cleaning brush roller 101, and the scraping blade 103 contacts the collection roller 102 to scrape the toner from the surface of the collection roller 102.

A voltage having the polarity (that is, the positive polarity) opposite to the normal charge polarity (that is, negative polarity) of the toner is applied to the cleaning brush rollers 101 in each of the pre-cleaner 100*a* and the normally-charged-toner cleaner 100*b* to electrostatically remove toner having the normally charged polarity on the intermediate transfer belt 8. A voltage having a positive polarity higher than the voltage of the cleaning brush roller 101 is applied to the collection roller 102 in each of the pre-cleaner 100*a* and the normally-charged-toner cleaner 100*b* to electrostatically collect toner having the normally charged polarity adhering to the cleaning brush roller 101.

A voltage having the normal charge polarity of the toner (that is, the negative polarity) is applied to the cleaning brush rollers 101 in the reversely-charged-toner cleaner 100*c* to electrostatically remove the reversely charged toner on the intermediate transfer belt 8. A voltage having a negative polarity higher than the voltage of the cleaning brush roller 101 is applied to the collection roller 102 in the reversely-charged-toner cleaner 100*c* to electrostatically collect the reversely charged toner adhering to the cleaning brush roller 101.

The cleaning backup rollers 13, 14, and 15 disposed inside the loop of the intermediate transfer belt 8 interposes the intermediate transfer belt 8 in a space with the cleaning brush rollers 101 of the pre-cleaner 100*a*, the normally-charged-toner cleaner 100*b*, the reversely-charged-toner cleaner 100*c*. In this manner, the outer circumferential surface of the intermediate transfer belt 8 contacts the cleaning brush rollers 101 of the pre-cleaner 100*a*, the normally-charged-toner cleaner 100*b*, and the reversely-charged-toner cleaner 100*c* to form cleaning nips.

The lubricant applying device 200 applies lubricant to the surface of the intermediate transfer belt 8 in order to protect the surface of the intermediate transfer belt 8. The lubricant applying device 200 includes a solid lubricant 202 such as a lump of zinc stearate, and an application brush roller 201 serving as an applicator. The application brush roller 201 contacts a solid lubricant 202, rotates to scrape the solid lubricant 202, and applies lubricant powder obtained by scraping the solid lubricant 202 to the surface of the intermediate transfer belt 8.

The printer 60 according to the present embodiment includes a sheet tray 31 and a sheet feeder 30. The sheet tray 31 stores a sheet P as a recording medium. The sheet feeder 30 includes a sheet feed roller 32 that feeds the sheet P from the sheet tray 31 to a feeding passage. The printer 60 includes a registration roller pair 33 on the right of the secondary transfer nip in FIG. 1. The registration roller pair 33 receives the sheet P fed from the sheet feeder 30 and feeds forwards the secondary transfer nip at a specified time.

The printer 60 includes a fixing device 40 on the left of the secondary transfer nip in FIG. 1. The fixing device 40 includes a heating roller 41 and a pressure roller 42. The heating roller 41 and the pressure roller 42 receive the sheet P sent from the secondary transfer nip and perform a fixing process that fixes a toner image onto the sheet P.

The printer 60 includes a bottle storage 50 on the upper right of the optical writing unit 20 in FIG. 1. The bottle storage 50 stores toner bottles 51Y, 51M, 51C, and 51K. The toner bottles 51Y, 51M, 51C, and 51K store yellow toner, magenta toner, cyan toner, and black toner, respectively. The yellow toner, the magenta toner, the cyan toner, and the black toner are supplied to the developing devices 5Y, 5M, 5C, and 5K, respectively, as necessary.

In response to receiving image data sent from, for example, a personal computer, a controller in the printer 60 controls the driver to rotate the driving roller 11, and the driving roller 11 rotates the intermediate transfer belt 8. The rollers inside the loop of the intermediate transfer belt 8 other than the driving roller 11 are rotated by the intermediate transfer belt 8. At the same time, the intermediate transfer belt 8 rotates the photoconductors 6Y, 6M, 6C, and 6K in the process units 1Y, 1M, 1C, and 1K. The charging devices 2Y, 2M, 2C, and 2K uniformly charge the surfaces of the photoconductors 1Y, 1M, 1C, and 1K, respectively. The optical writing unit 20 emits the laser beams L to irradiate the surfaces of the photoconductors 1Y, 1M, 1C, and 1K to form electrostatic latent images on the surfaces of the photoconductors 1Y, 1M, 1C, and 1K.

The developing devices 5Y, 5M, 5C, and 5K develop the electrostatic latent images formed on the surfaces of the photoconductors 1Y, 1M, 1C, and 1K to obtain the yellow toner image, the magenta toner image, the cyan toner image, and the black toner image on the surfaces of the photoconductors 1Y, 1M, 1C, and 1K, respectively. In the primary transfer nips, the yellow toner image, the magenta toner image, the cyan toner image, and the black toner image are primarily transferred and superimposed on the outer circumferential surface of the intermediate transfer belt 8. As a result, a four-color superimposed toner image is formed on the outer circumferential surface of the intermediate transfer belt 8.

Meanwhile, in the sheet feeder 30, the sheet feed roller 32 feeds the sheets P from the sheet tray 31 one by one to the registration roller pair 33. The registration roller pair 33 sends the sheet P to the secondary transfer nip such the nipped sheet P can be synchronized with the four-color toner image formed on the intermediate transfer belt 8, and the four-color toner image is secondarily transferred onto the sheet P all at once. Consequently, a full-color image is formed on the surface of the sheet P. The sheet P bearing the four-color toner image is conveyed from the secondary transfer nip to the fixing device 40, and the fixing device 40 performs a fixing process to fix the four-color toner image onto the sheet P.

After the yellow, magenta, cyan and black toner images are primarily transferred onto the intermediate transfer belt 8, the drum cleaners 4Y, 4M, 4C, and 4K remove residual toner that is not primarily transferred onto the intermediate transfer belt 8 and remains on the photoconductors 1Y, 1M, 1C, and 1K. After a static eliminating lamp removes residual potentials from the photoconductors 1Y, 1M, 1C, and 1K, the charging devices 2Y, 2M, 2C, and 2K uniformly charge the photoconductors 1Y, 1M, 1C, and 1K, respectively, as preparation for subsequent image formation. The belt cleaner 100 removes residual toner that is not secondarily transferred onto the sheet P and remains on the intermediate transfer belt 8.

Figure 2:
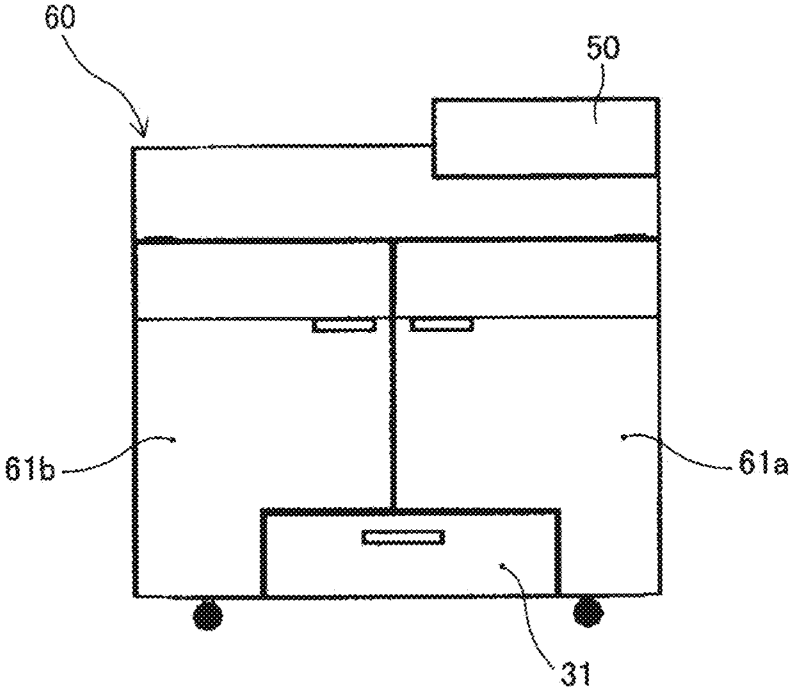
FIG. 2 is a front view of the exterior of the printer illustrated in FIG. 1.

FIG. 2 is a front view of the exterior of the printer 60. As illustrated in FIG. 2, a pair of front doors 61*a* and 61*b* as an opening-and-closing cover for opening and closing an opening portion 60*a* of a body of the printer 60 (hereinafter referred to as an apparatus body) are disposed on the front face of the printer 60. The front door 61*a* on the right in FIG. 2 is rotatably attached to the right end of the apparatus body by a hinge in FIG. 2. The front door 61*b* on the left in FIG. 2 is rotatably attached to the right end of the apparatus body by a hinge in FIG. 2, so that the opening portion 60*a* of the apparatus body is opened and closed in a double-door opening manner.

Figure 3:
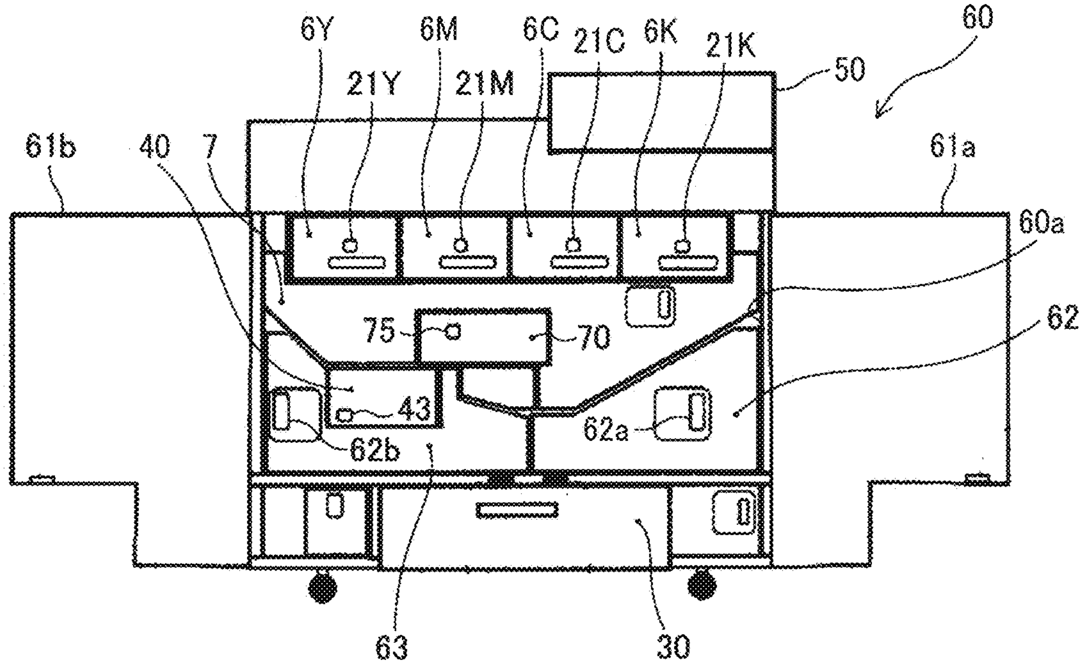
FIG. 3 is a front view of the exterior of the printer with a pair of front doors opened.

FIG. 3 is a front view of the exterior of the printer 60 opening the pair of front doors 61*a* and 61*b*. As illustrated in FIG. 3, opening the pair of front doors 61*a* and 61*b* exposes the process units 6Y, 6M, 6C, and 6K, the transfer unit 7, the fixing device 40, the sheet conveying section 62, and the sheet ejection section 63. The sheet conveying section 62 conveys the sheet P sent from the sheet feeder 30 toward a secondary transfer roller 18. The sheet ejection section 63 conveys the sheet P that has passed through the fixing device 40 and ejects the sheet P to the outside of the printer 60.

The process units 6Y, 6M, 6C, and 6K include lock mechanisms 21Y, 21M, 21C, and 21K, respectively. Opening a lock of each of the lock mechanisms 21Y, 21M, 21C, and 21K enables a service person in front of the printer 60 to attach each of the process units 6Y, 6M, 6C, and 6K to the printer 60 and detach each of the process units 6Y, 6M, 6C, and 6K from the printer 60. The process units 6Y, 6M, 6C, and 6K may be capable of being pulled out from the body of the printer 60 to replace components (such as the photoconductors 1Y, 1M, 1C, and 1K, the charging devices 2Y, 2M, 2C, and 2K, the developing devices 5Y, 5C, 5M, and 5K, and the drum cleaners 4Y, 4M, 4C, and 4K) of the process units 6Y, 6M, 6C, and 6K.

The fixing device 40 also includes a lock mechanism 43 to lock the fixing device 40 to the body of the printer 60. Opening the lock mechanism 43 enables an operator in front of the printer 60 to attach the fixing device 40 to the printer 60 and detach the fixing device 40 from the printer 60. The fixing device 40 may be mounted on the sheet ejection section 63 and may be attached to and detached from the printer 60 by pulling out the sheet ejection section 63 from the body of the printer 60 and lifting the fixing device 40.

The sheet conveying section 62 and the sheet ejection section 63 are disposed to be pulled out from the body of the printer 60. When a sheet jam occurs in the sheet conveying section 62 and the sheet ejection section 63, unlocking the lock mechanisms 62*a* and 62*b* from the apparatus body enables pulling out the sheet conveying section 62 and the sheet ejection section 63 from the body of the apparatus body and removing the jammed sheet.

Figure 4A:
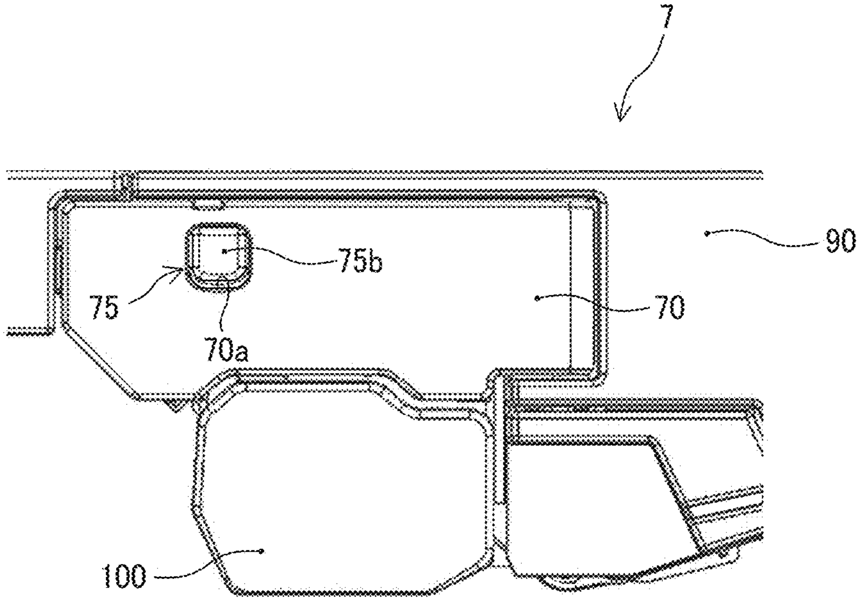
FIG. 4A is an enlarged front view of the periphery of a small transfer door that is being closed.
Figure 4B:
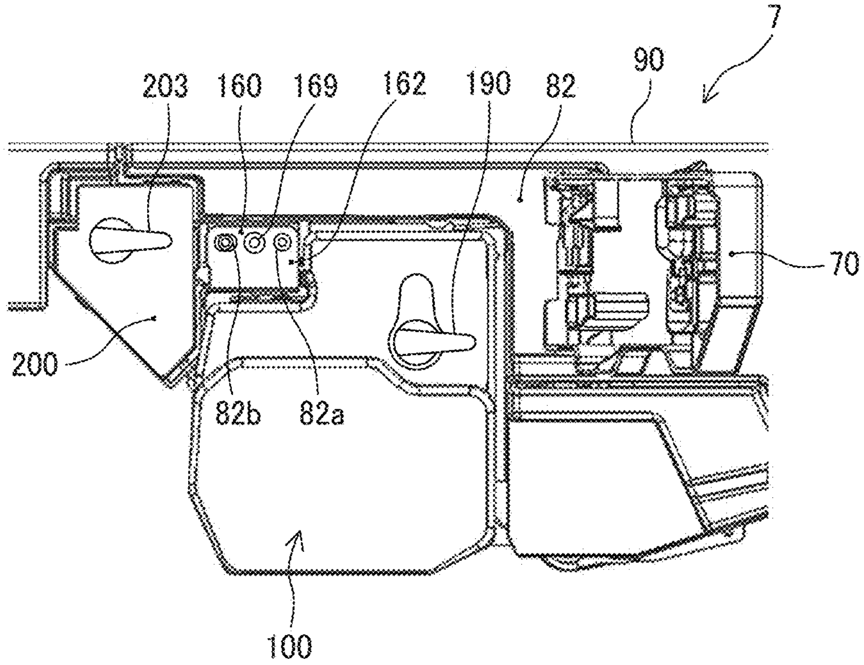
FIG. 4B is an enlarged front view of the periphery of the small transfer door that is being opened.

The intermediate transfer unit 7 includes a small transfer door 70 as an opening-and-closing member. FIG. 4A is an enlarged front view of the periphery of the small transfer door 70 that is being closed. FIG. 4B is an enlarged front view of the periphery of the small transfer door 70 that is being opened. The small transfer door 70 includes a lock 75 to lock the small transfer door 70 at a closed position illustrated in FIG. 4A. The lock 75 is attached to the small transfer door 70 to be movable within a specified range in the vertical direction and is biased vertically upward by a biasing member such as a spring. The lock 75 has an operation portion 75*b* recessed inward for an operator to operate the lock 75. The operation portion 75*b* is exposed from an opening portion 70*a* of the small transfer door 70.

When an operator opens the small transfer door 70, the operator inserts his or her finger into the operation portion 75*b* of the lock 75 through the opening portion 70*a* of the small transfer door 70 and pushes the lock 75 downward against a biasing force of the spring. As a result, the lock 75 moves downward, and the lock is released. Thus, the small transfer door 70 is movable to an opened position as illustrated in FIG. 4B.

When the small transfer door 70 is opened, the upper portion of the belt cleaner 100, the lubricant applying device 200, and a tensioner 160 that support the tension roller 16, which have been covered by the small transfer door 70, are exposed. In FIGS. 4A and 4B, the reference sign 82 denotes a front frame 82 of the intermediate transfer unit 7, and the reference sign 90 denotes an inner cover as a cover that covers the front frame 82.

The intermediate transfer unit 7 includes a cleaning lock lever 190 for locking the belt cleaner 100 to the intermediate transfer unit 7. The cleaning lock lever 190 is rotated counterclockwise by 90° from the state illustrated in FIG. 4B, so that the cleaning lock lever 190 is unlocked. With such a configuration, the belt cleaner 100 can be removed from the intermediate transfer unit 7. When the cleaning lock lever 190 is rotated counterclockwise by 90° from the state illustrated in FIG. 4B, the cleaning backup rollers 13, 14, and 15 are separated from the corresponding cleaning brush rollers 101, and the intermediate transfer belt 8 is separated from the three cleaning brush rollers 101 of the belt cleaner 100. With such a configuration, the belt cleaner 100 can be removed from the intermediate transfer unit 7 without damaging the surface of the intermediate transfer belt 8.

The lubricant applying device 200 includes a lubrication lock lever 203 for locking the lubricant applying device 200 to the intermediate transfer unit 7. The lubrication lock lever 203 is rotated counterclockwise by 90° from the state illustrated in FIG. 4B, so that the lubrication lock lever 203 is unlocked. Thus, the lubricant applying device 200 can be removed from the intermediate transfer unit 7.

The tensioner 160 is positioned by positioning pins 82*a* and 82*b* disposed on the front frame 82 of the intermediate transfer unit 7 and is fixed to the intermediate transfer unit 7 by a screw 169.

Figure 5:
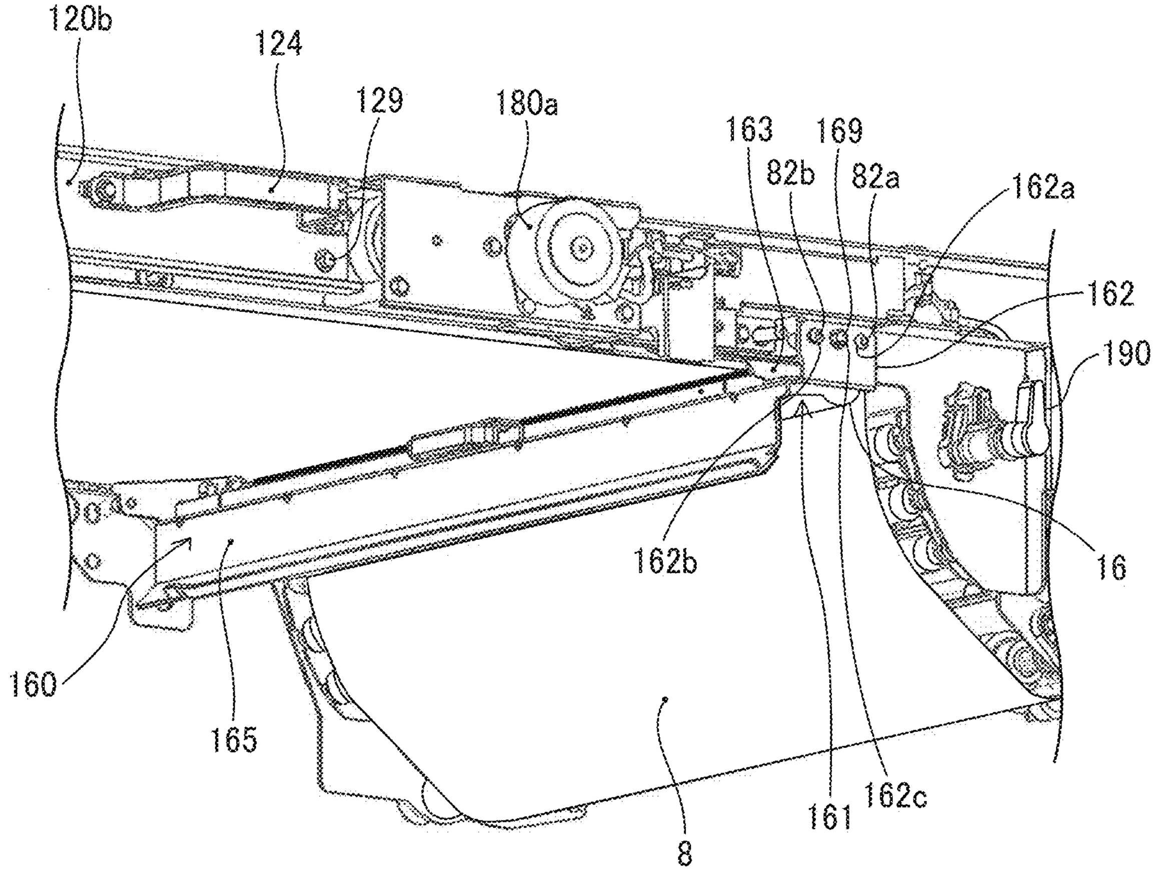
FIG. 5 is a perspective view of a tensioner attached to an intermediate transfer unit as viewed from below.

FIG. 5 is a perspective view of the tensioner 160 attached to the intermediate transfer unit 7 viewed from below. The tensioner 160 mainly includes a roller holder that rotatably supports the tension roller 16, a base 161 that holds the roller holder to be swingable or slidable, and a pressing mechanism that presses the tension roller 16 supported by the roller holder against the intermediate transfer belt 8.

The base 161 is made of a sheet metal, and an end in front of the apparatus is bent upward by 90° to form a positioning face portion 162. The positioning face portion 162 has positioning holes 162*a* and 162*b* into which the positioning pins 82*a* and 82*b* disposed on the front frame 82 of the intermediate transfer unit 7 are inserted. The positioning face portion 162 has a screw through-hole 162*c* through which the screw 169 for screwing the tensioner 160 to the front frame 82 penetrates.

The base 161 has a guide 165 that guides the movement (movement in the front-and-rear direction of the apparatus) of the lubricant applying device 200 when the lubricant applying device 200 is attached to the intermediate transfer unit 7. The base 161 has a holder holding plate 163 that holds the front end of the roller holder on the rear side of the apparatus (inside the apparatus) with respect to the positioning face portion 162. When the tensioner 160 is attached to the intermediate transfer unit 7, a specified gap is formed between the holder holding plate 163 and the front frame 82.

When the tensioner 160 is removed from the intermediate transfer unit 7, first, the belt cleaner 100 and the lubricant applying device 200 are removed, and the intermediate transfer unit 7 is pulled out from the apparatus body. Next, the screw 169 is removed to release the fastening of the tensioner 160. Next, the tensioner 160 is moved to the front side, and then the positioning pins 82*a* and 82*b* are pulled out from the positioning holes 162*a* and 162*b*. As described above, a specified gap is formed between the holder holding plate 163 and the front frame 82, so that the tensioner 160 is movable to the front side by the gap. With such a configuration, the positioning pins 82*a* and 82*b* can be pulled out from the positioning holes 162*a* and 162*b*. Finally, the tensioner 160 is moved downward, so that the tensioner 160 can be removed from the intermediate transfer unit 7.

Figure 6:
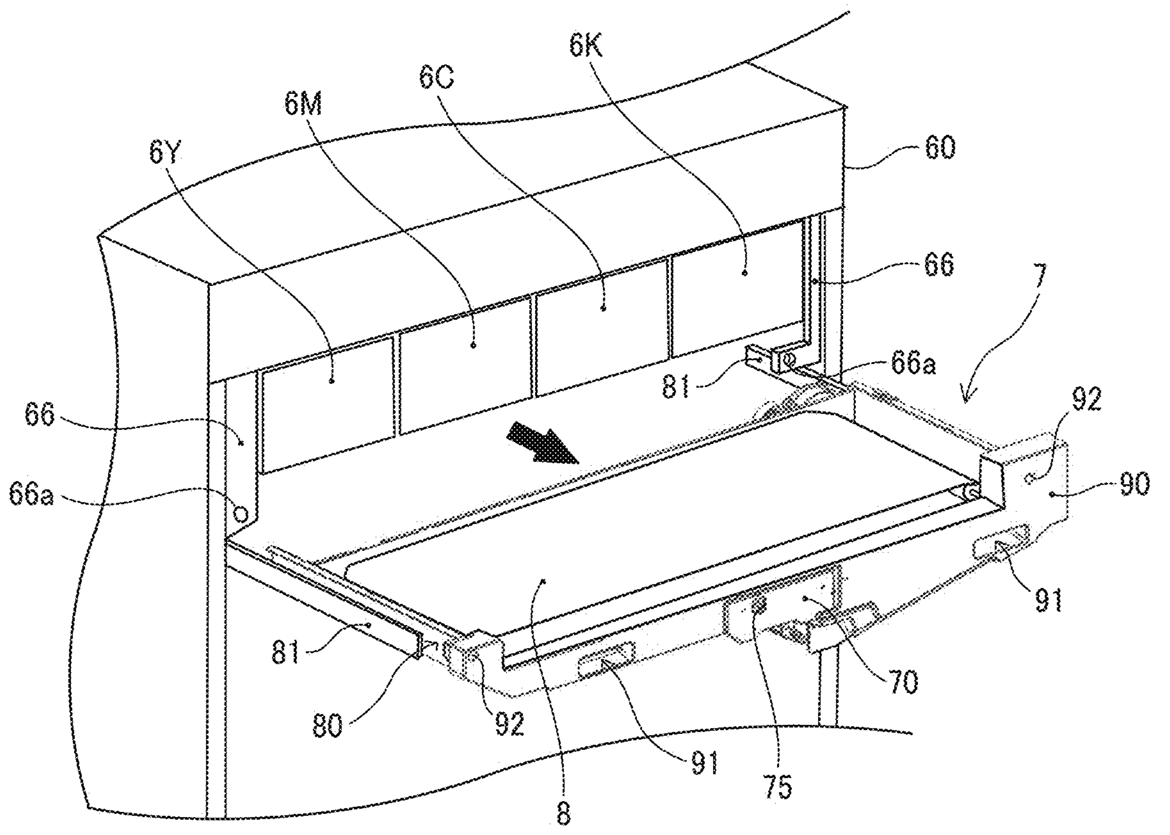
FIG. 6 is a perspective view of the intermediate transfer unit that is being pulled out from an apparatus body.
Figure 7:
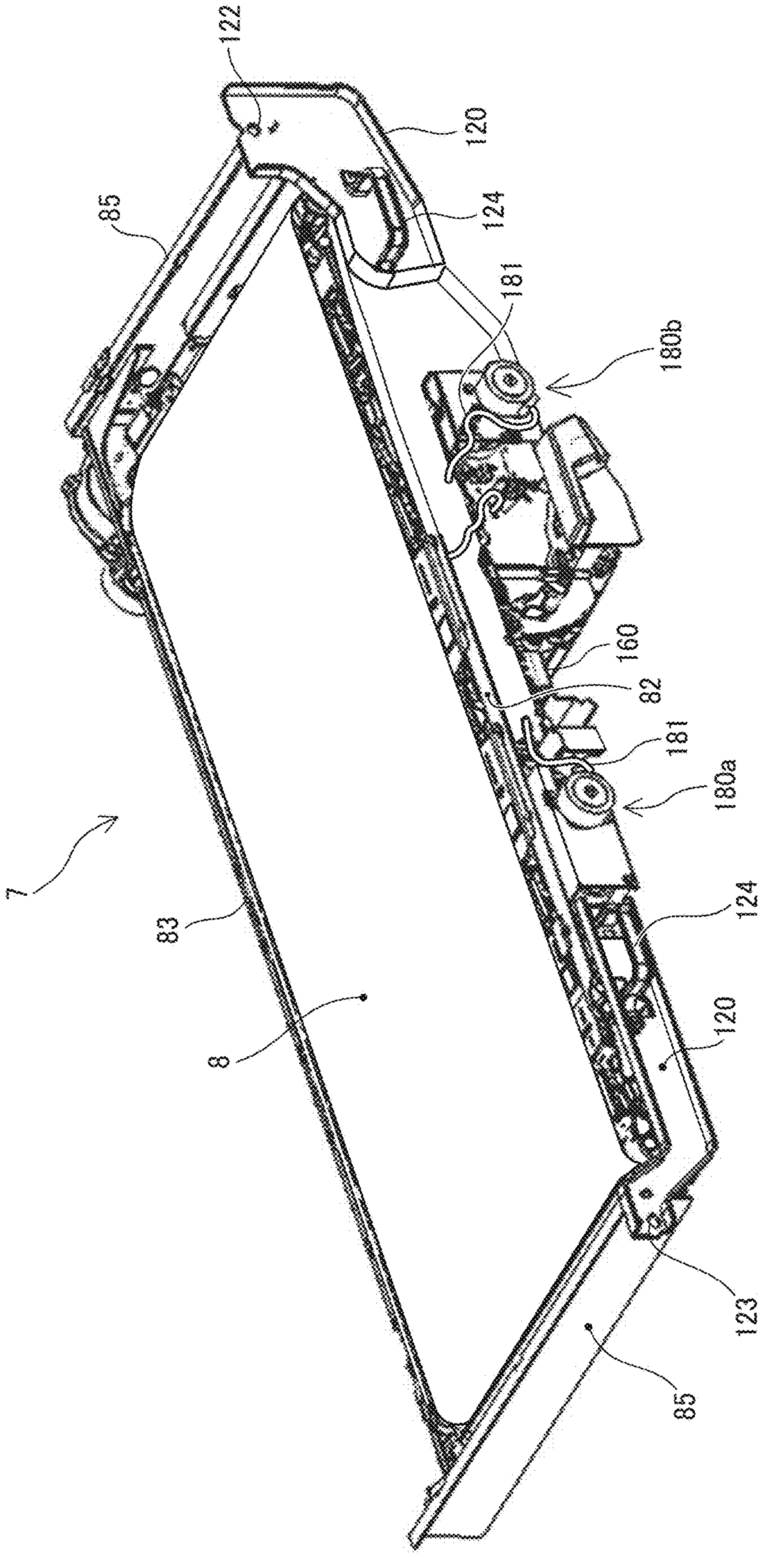
FIG. 7 is a schematic perspective view of the intermediate transfer unit with an inner cover removed.
Figure 8A:
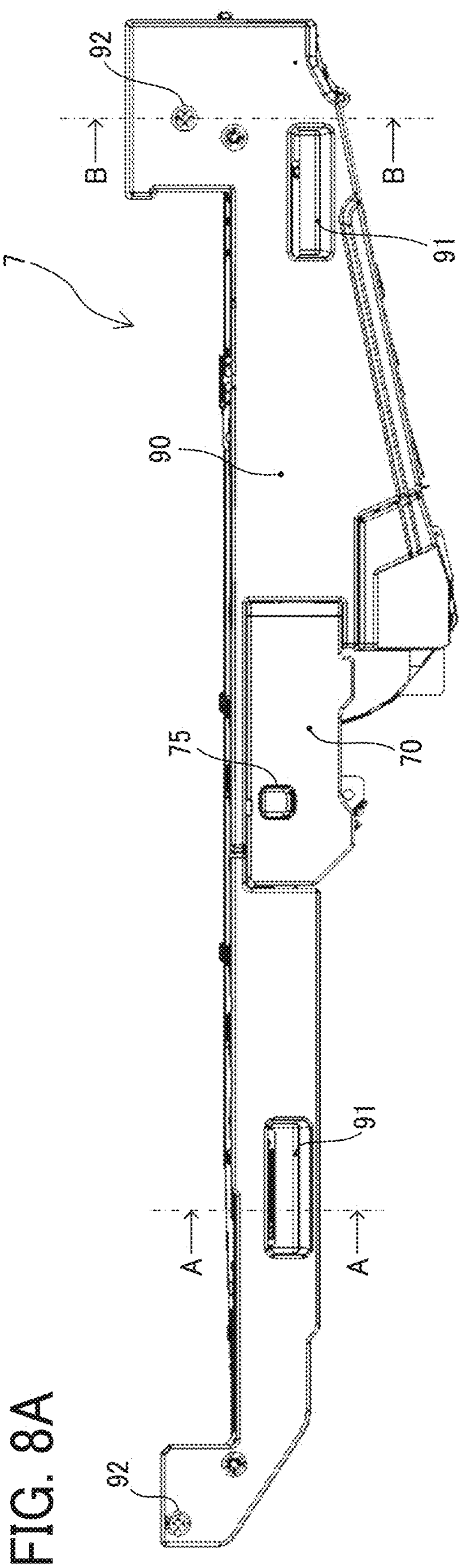
FIG. 8A is a front view of the intermediate transfer unit to which the inner cover is attached.
Figure 8B:
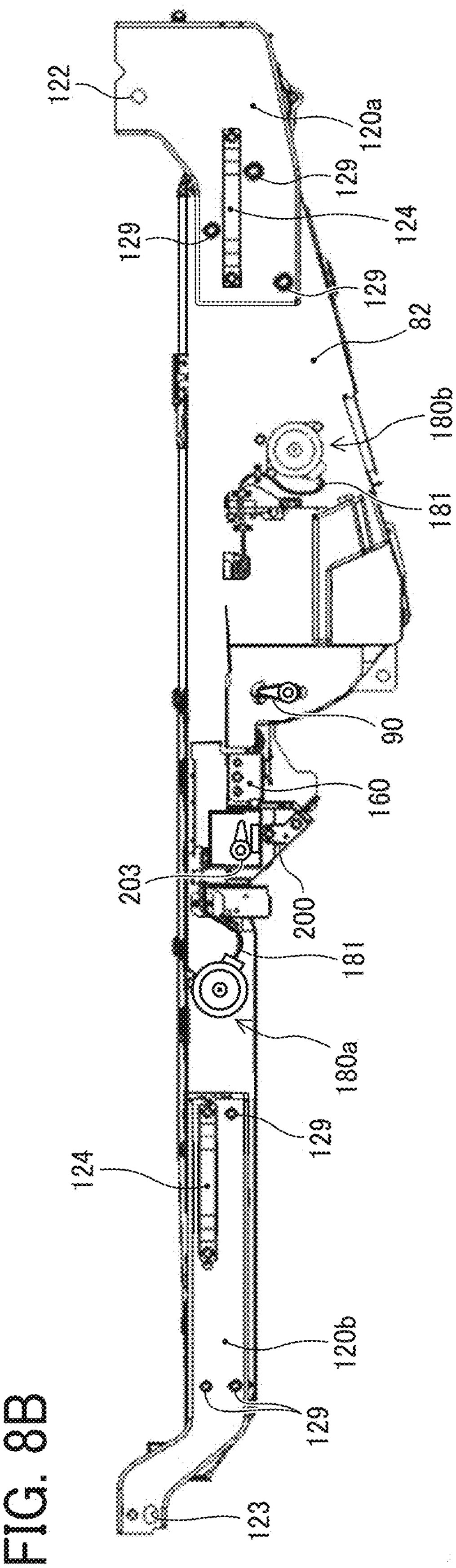
FIG. 8B is a front view of the intermediate transfer unit from which the inner cover is detached.

FIG. 6 is a perspective view of the intermediate transfer unit 7 in a state of being pulled out from the apparatus body. FIG. 7 is a perspective view of the intermediate transfer unit 7 from which an inner cover 90 as a cover is removed. FIG. 8A is a front view of the intermediate transfer unit 7 with the inner cover 90 attached thereto. FIG. 8B is a front view of the intermediate transfer unit 7 with the inner cover 90 removed therefrom.

The intermediate transfer unit 7 includes a frame housing 80 that is a housing that supports a plurality of stretching rollers disposed inside the loop of the intermediate transfer belt 8, the tensioner 160, the belt cleaner 100, and the lubricant applying device 200. The frame housing 80 is supported by a slide rail 81 disposed in the apparatus body to be slidable in the front-and-rear direction of the apparatus body.

As illustrated in FIG. 7, the frame housing 80 includes the front frame 82 made of sheet metal and orthogonal to the front-and-rear direction of the apparatus (also in the direction in which the intermediate transfer unit 7 is pulled out), and a rear frame 83 made of sheet metal and orthogonal to the front-and-rear direction of the apparatus. Lateral frames 85 are disposed at both ends of the frame housing 80 in the right and left direction of the apparatus.

Figure 9A:
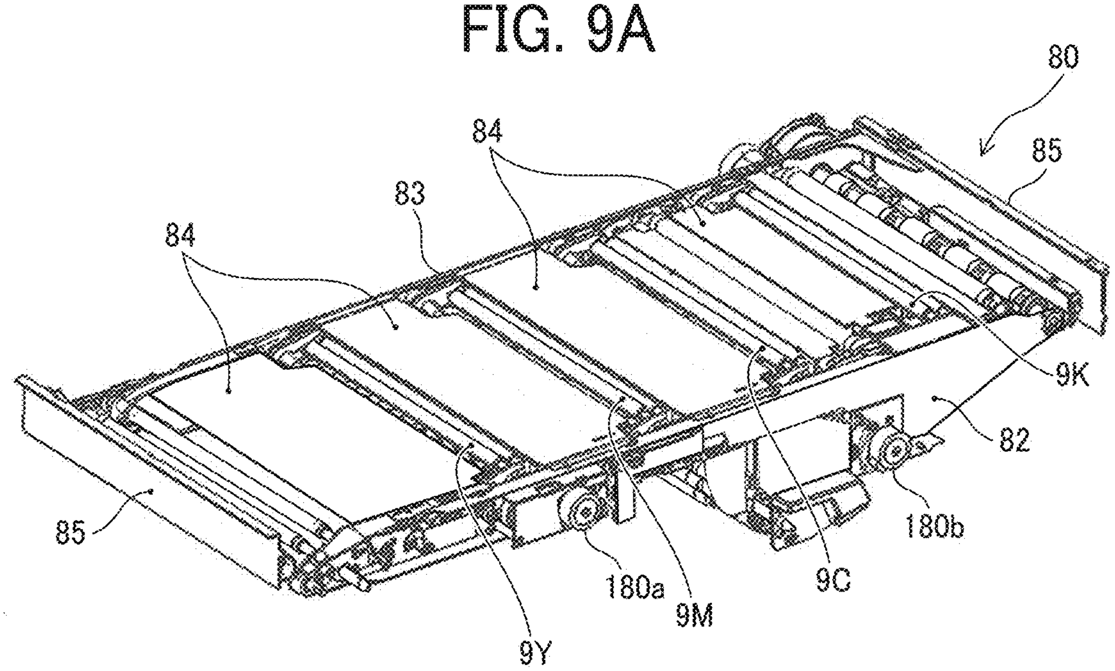
FIG. 9A is a perspective view of the intermediate transfer unit from which an intermediate transfer belt is removed.
Figure 9B:
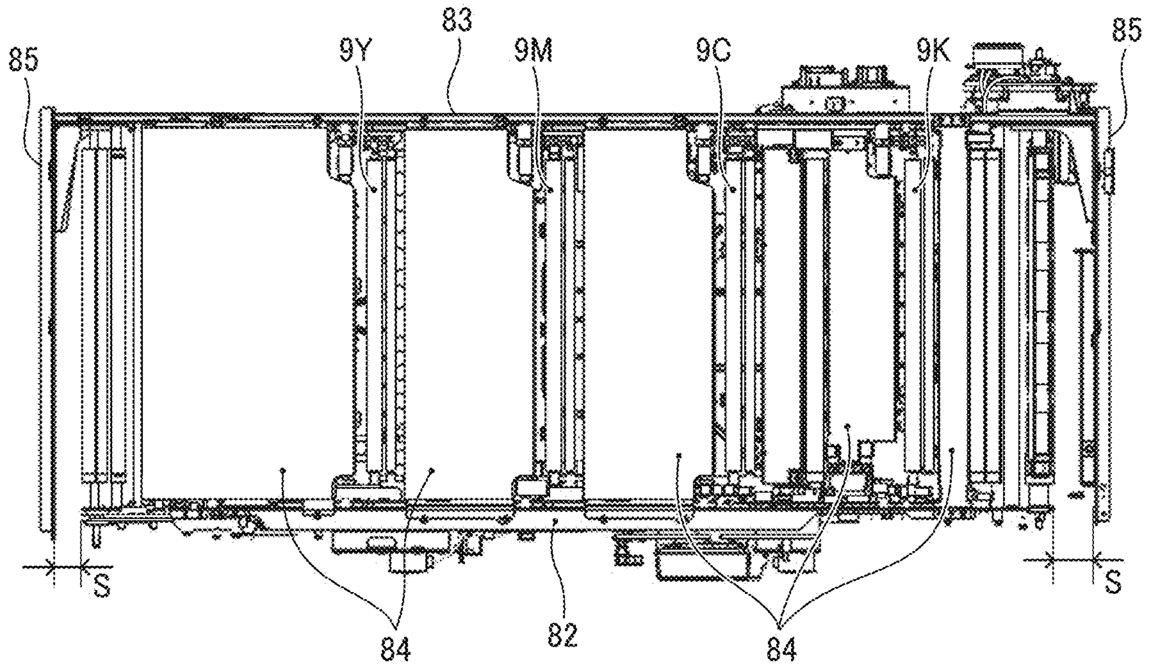
FIG. 9B is a top view of the intermediate transfer unit from which the intermediate transfer belt is removed.

FIG. 9A is a perspective view of the intermediate transfer unit 7 illustrating a state in which the intermediate transfer belt 8 is removed from the intermediate transfer unit 7. FIG. 9B is a top view of the intermediate transfer unit 7 illustrating a state in which the intermediate transfer belt 8 is removed from the intermediate transfer unit 7. As illustrated in FIGS. 9A and 9B, the frame housing 80 includes a plurality of stays 84. One end of each of the plurality of stays 84 is fixed to the front frame 82, and the other end of each of the plurality of stays 84 is fixed to the rear frame 83.

The frame housing 80 includes a handle 124 as a grip, and a pair of front plates 120*a* and 120*b* made of metal plates. One front plate 120*a* of the two front plates 120*a* and 120*b* is screwed to the right end of the front frame 82 by screws 129 (see FIGS. 8A and 8B), and the other front plate 120*b* is screwed to the left end of the front frame 82 by the screws 129. In the present embodiment, the front frame 82 and the pair of front plates 120*a* and 120*b* form a downstream side front plate of the housing.

One front plate 120*a* has a circular positioning hole 122 serving as a main reference for positioning the intermediate transfer unit 7 with respect to the apparatus body. The other front plate 120*b* has a long-hole shaped positioning hole 123, which is a long hole in the right and left direction of the apparatus, serving as a sub-reference for positioning the intermediate transfer unit 7 with respect to the apparatus body.

As to be described later, screws 125 (see FIG. 10) are inserted into the positioning holes 122 and 123, and the screws 125 are screwed into screw holes 66*a* arranged in a front side plate 66 of the apparatus body illustrated in FIG. 6, so that the intermediate transfer unit 7 is positioned and fastened to the apparatus body.

The intermediate transfer unit 7 is screwed to the apparatus body, so that the intermediate transfer unit 7 cannot be easily pulled out from the apparatus body. As a result, the intermediate transfer unit 7 is prevented from being pulled out during works except for a work (e.g., the maintenance work) by a serviceman as a worker.

As described above, the frame housing 80 supports a large number of functional devices of the intermediate transfer unit 7, such as the plurality of stretching rollers disposed inside the loop of the intermediate transfer belt 8, the tensioner 160, the belt cleaner 100, and the lubricant applying device 200. In this way, the frame housing 80 supports multiple functional devices, and thus the load applied to the frame housing 80 increases. However, a pair of front plates 120*a* and 120*b* are positioned and fastened to the apparatus body fastened to the structure of the frame housing 80 and the front frame 82, so that these multiple functional devices can be firmly supported without being deformed even when the load applied to the frame housing 80 is large.

A drive motor 180*a* for driving a contact-and-separation mechanism that causes the primary transfer rollers 9Y, 9M, and 9C of the colors Y, M, and C to contact and be separated from the photoconductors 1Y, 1M, and 1C is attached to the front frame 82. A drive motor 180*b* for driving a contact-and-separation mechanism that causes the primary transfer roller 9K for color K to contact and be separated from the photoconductors 1K is also attached to the front frame 82. A cable 181 for supplying electric power to the drive motors 180*a* and 180*b* is routed on the front frame 82.

As illustrated in FIG. 6, the inner cover 90, which is made of resin, as a cover that covers the front plate 120*a*, the front plate 120*b*, and the front frame 82 is attached to the frame housing 80. With such a configuration, the drive motor 180*a*, the drive motor 180*b*, and the cables 181 attached to the front frame 82 are covered by the inner cover 90.

As described above, when a sheet jam has occurred, a pair of front doors 61*a* and 61*b* are opened, and then the sheet conveying section 62 and the sheet ejection section 63 are pulled out to perform jam processing. When the electric components such as the drive motor 180*a*, the drive motor 180*b*, and the cables 181 are not covered by the inner cover 90, inadvertent touching these electrical components may occur. As a result, for example, the cable 181 may come off the drive motor, or the electrical component attached to the front frame 82 may be damaged. The front plate 120*a*, the front plate 120*b*, and the front frame 82 are made of metal plates. If a user accidentally touches these pointed portions of the metal plates, the user may be injured.

On the other hand, as illustrated in the present embodiment, the inner cover 90 covers the front plate 120*a*, the front plate 120*b*, and the front frame 82, so that inadvertent touching the drive motor 180*a*, the drive motor 180*b*, and the cables 181 held by the front frame 82 of a user can be prevented. Further, inadvertent touching a dangerous place such as a pointed portion of the front plate 120*a*, the front plate 120*b*, and the front frame 82 of a user can be prevented. Further, the front plate 120*a*, the front plate 120*b*, and the front frame 82 are covered with the inner cover 90, so that the appearance when the front doors 61*a* and 61*b* are opened can be enhanced.

Figure 10:
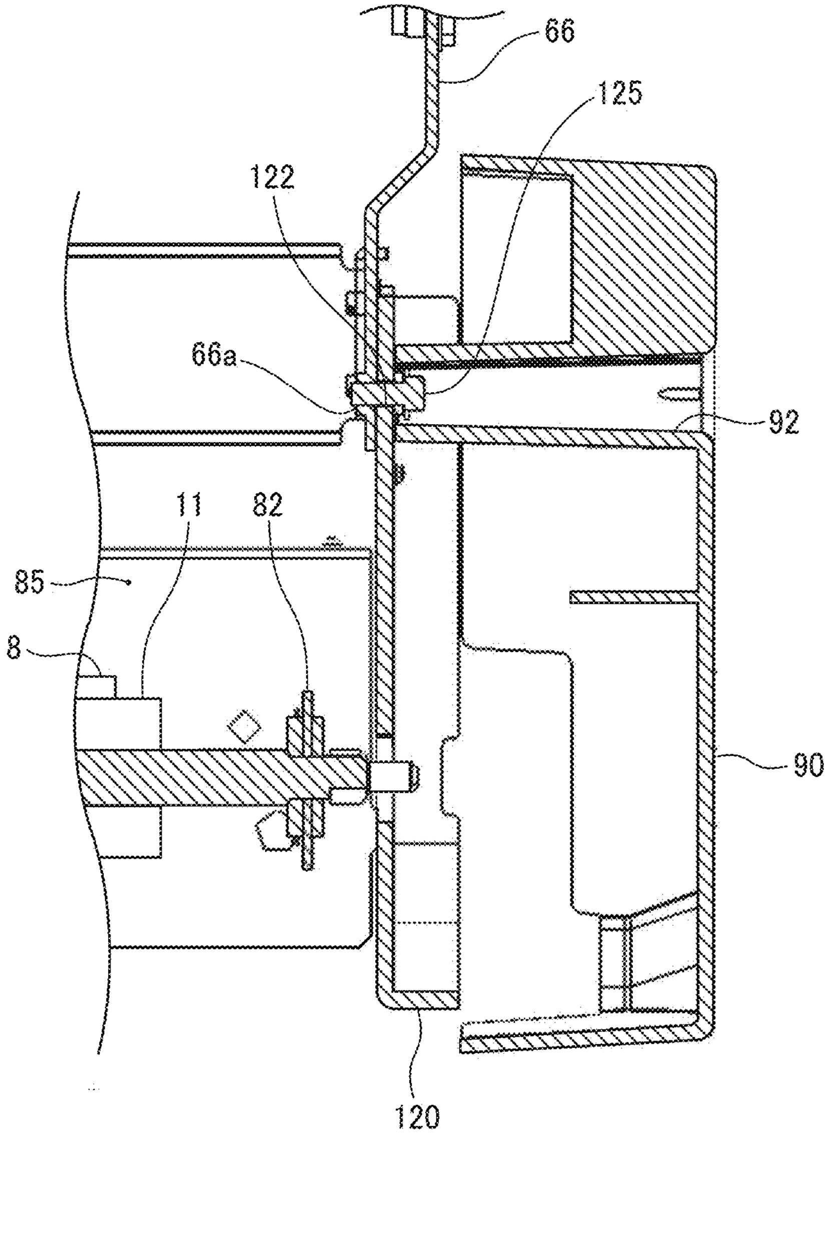
FIG. 10 is a cross-sectional view of the intermediate transfer unit taken along line B-B in FIG. 8A.

As illustrated in FIGS. 6 and 8A, screw guide holes 92 that guide the screws 125 for screwing the intermediate transfer unit 7 to the apparatus body are arranged at both ends of the inner cover 90 in the right and left direction. FIG. 10 is a cross-sectional view taken along line B-B in FIG. 8A. As illustrated in FIG. 10, the screw guide hole 92 is formed to communicate with the positioning hole 122 of the front plate 120. When the intermediate transfer unit 7 is pulled out from the apparatus body, a screwdriver is inserted into the screw guide hole 92 to access the screw 125 screwed into the screw hole 66*a* of the front side plate 66, and the screw 125 is removed from the screw hole 66*a*. At this time, the screw 125 may be detached from the screwdriver and fall. However, even if the screw 125 falls from the screwdriver, the screw 125 can be received by the screw guide hole 92 and can be prevented from falling into the apparatus body. In other words, the screw guide hole 92 functions as a fall prevention portion.

The inner cover 90 is made of resin and has low rigidity. Accordingly, when the handle 124 for pulling out the intermediate transfer unit 7 is disposed on the inner cover 90, the following inconvenience may occur. In other words, as described above, the intermediate transfer unit 7 includes multiple functional devices of the intermediate transfer unit 7, such as the tensioner 160, the belt cleaner 100, and the lubricant applying device 200, and is heavy in weight. Accordingly, when the intermediate transfer unit 7 having a heavy weight is pulled out by gripping the handle 124 disposed on the inner cover 90, the inner cover 90 may be deformed.

On the other hand, as in the present embodiment, the handles 124 are disposed on the front plates 120*a* and 120*b* of the frame housing 80 made of a metal plate and having high rigidity, so that the intermediate transfer unit 7 can be pulled out without deformation of the front plates 120*a* and 120*b*. The frame housing 80 is reinforced by the plurality of stays 84 (see FIGS. 9A and 9B) in the front-and-rear direction of the apparatus as described above. Accordingly, when the intermediate transfer unit 7 is pulled out, the frame housing 80 is not deformed. The handle 124 may be disposed on the front frame 82 of the frame housing 80.

Since the inner cover 90 covers the front frame 82, the front plate 120*a*, and the front plate 120*b* of the frame housing 80, the handles 124 of the front plates 120*a* and 120*b* are also covered. Accordingly, in the present embodiment, as illustrated in FIG. 6, the inner cover 90 has a concave portion 91 for accessing the handles 124 disposed on the front plates 120*a* and 120*b*.

Figure 11:
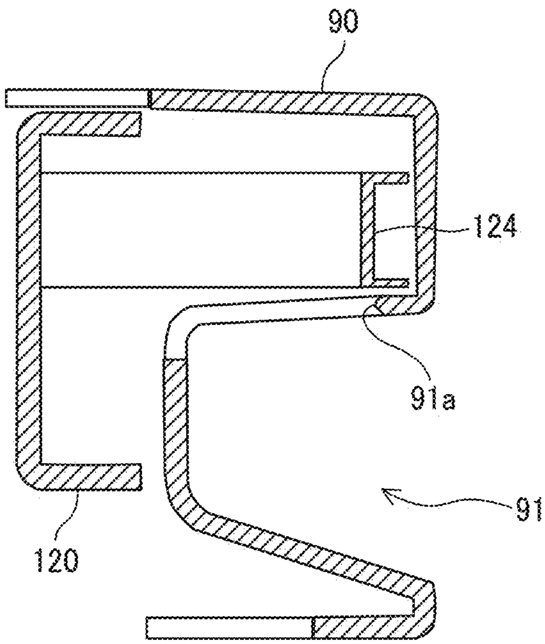
FIG. 11 is a cross-sectional view of the intermediate transfer unit taken along line A-A in FIG. 8A.
Figure 12:
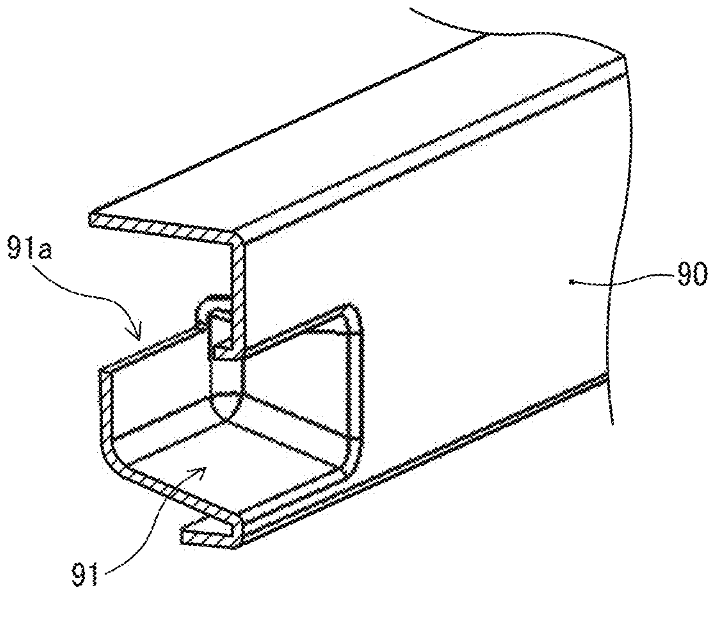
FIG. 12 is a cross-sectional perspective view of an inner cover.

FIG. 11 is a cross-sectional view taken along line A-A of FIG. 8A, and FIG. 12 is a cross-sectional perspective view of the inner cover 90. As illustrated in FIGS. 11 and 12, the inner cover 90 has the concave portion 91 positioned directly below the handle 124, and a hole 91*a* for allowing a serviceman as an operator to access the handle 124 in the upper surface of the concave portion 91.

When the intermediate transfer unit 7 is pulled out from the apparatus body, a serviceman can access the handle 124 by inserting his/her finger into the hole 91*a* of the concave portion 91. In this manner, the serviceman can pull out the intermediate transfer unit 7 from the apparatus body by gripping the handles 124 disposed on the front plates 120*a* and 120*b* without removing the inner cover 90. Accordingly, the operation of pulling out the intermediate transfer unit 7 can be simplified as compared with the case where the inner cover 90 is removed and the intermediate transfer unit 7 is pulled out.

Figure 13:
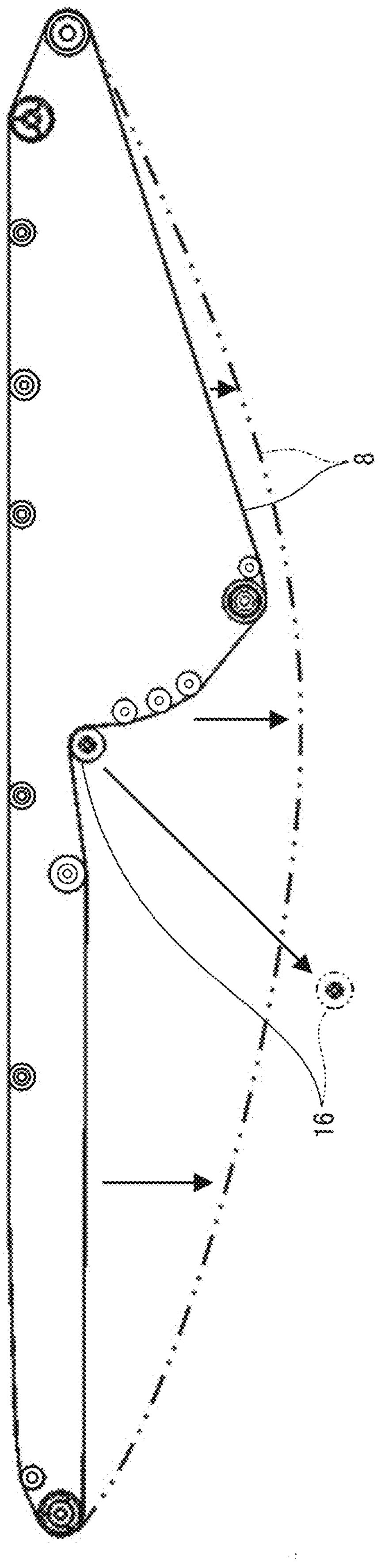
FIG. 13 is a view of the intermediate transfer belt before and after the tensioner is detached.

The serviceman pulls out the intermediate transfer unit 7 and removes the tensioner 160, so that the intermediate transfer belt 8 is loosened from the state indicated by the solid line in FIG. 13 to the state indicated by the two-dot chain line in FIG. 13. When the intermediate transfer belt 8 is loosened, the primary transfer rollers 9Y, 9M, 9C, and 9K and the secondary-transfer counter roller 12 in the loop of the intermediate transfer belt 8 can be removed from the frame housing 80 to replace with new rollers.

When the intermediate transfer belt 8 is replaced, the tensioner 160 is removed, and then the inner cover 90, the front plate 120*a*, and the front plate 120*b* are removed.

Figure 14A:
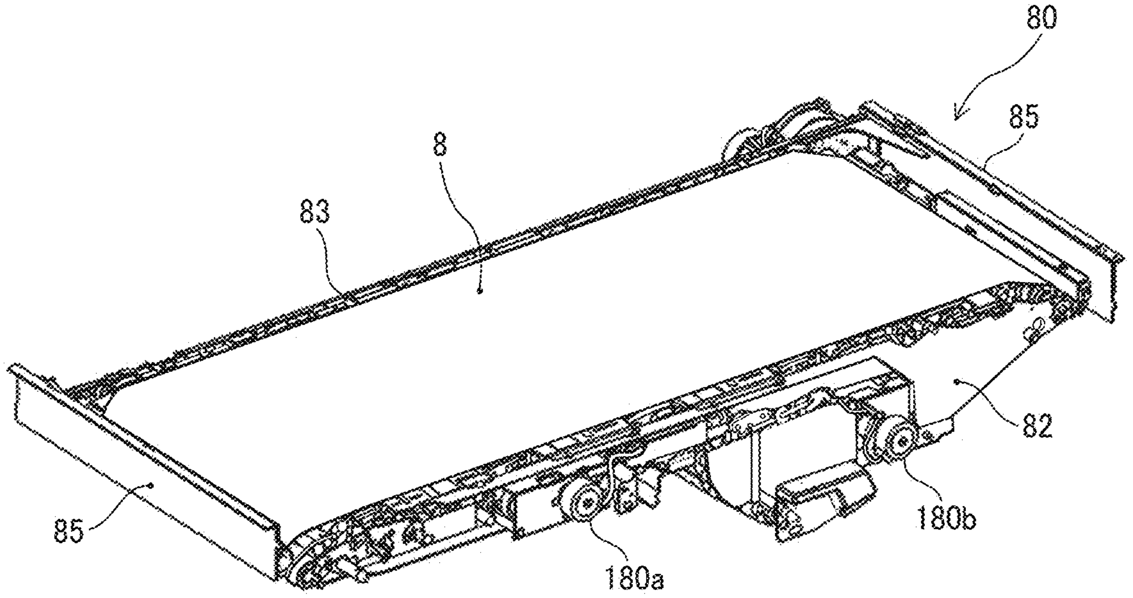
FIG. 14A is a perspective view of the intermediate transfer unit from which an inner cover and a front plate are removed.
Figure 14B:
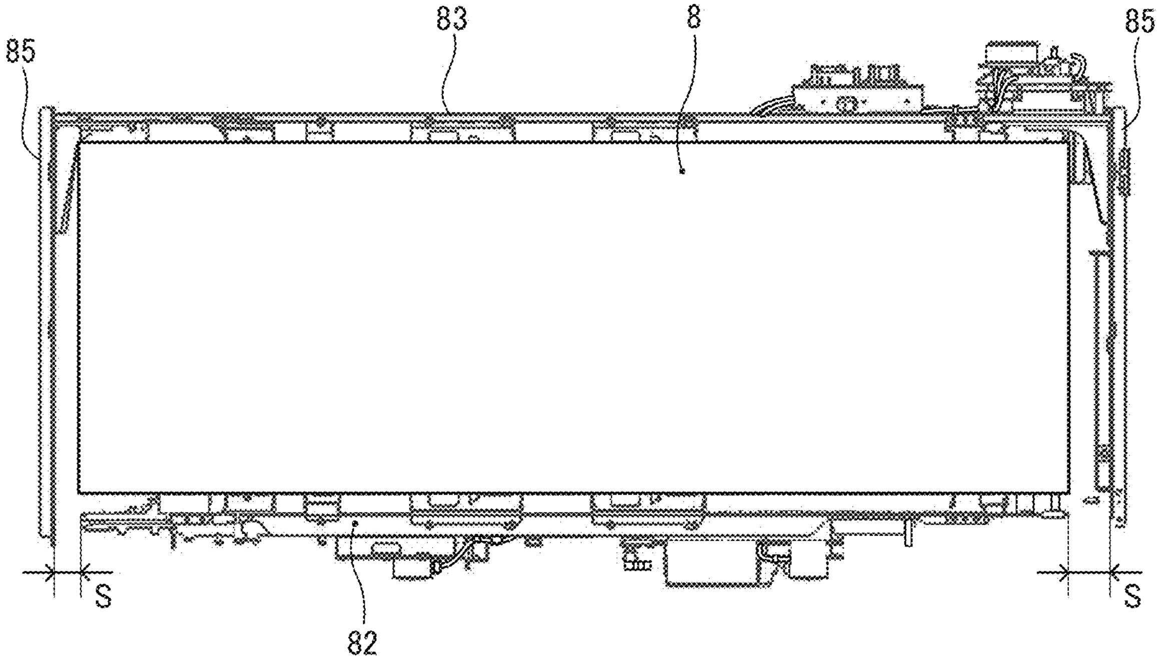
FIG. 14B is a top view of the intermediate transfer unit from which the inner cover and the front plate are removed.

FIG. 14A is a perspective view illustrating a state in which the inner cover 90, the front plate 120*a*, and the front plate 120*b* are removed, and FIG. 14B is a top view illustrating a state in which the inner cover 90, the front plate 120*a*, and the front plate 120*b* are removed. As illustrated in FIGS. 14A and 14B, the front frame 82 is shorter than the distance from one of the lateral frames to the other lateral frame in the right and left direction of the apparatus. The front frame 82 has a specified gap S between the front frame 82 and a lateral frame 85 of the frame housing 80. The inner cover 90, the front plate 120*a*, and the front plate 120*b* are removed, so that a passage for moving the intermediate transfer belt 8 to the front side is created. In this manner, the intermediate transfer belt 8 can be removed from the intermediate transfer unit 7 by passing the loosened intermediate transfer belt 8 through the gap S.

As described above, in the present embodiment, when the intermediate transfer belt 8 is exchanged, it is preferable to remove the inner cover 90. However, the tensioner 160, the lubricant applying device 200, and the belt cleaner 100 supported by the intermediate transfer unit 7 (frame housing 80), and the primary transfer rollers 9Y, 9M, 9C, and 9K and the stretching roller such as the secondary-transfer counter roller 12 in the loop of the intermediate transfer belt 8 can be replaced without removing the inner cover 90 as described above. Such a configuration can shorten the time required for maintenance of the intermediate transfer unit.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The above-described embodiments are given as examples, and, for example, the following aspects of the present disclosure may have advantageous effects described below.

First Aspect

An intermediate transfer unit (e.g., the intermediate transfer unit 7) includes an intermediate transfer belt (e.g., the intermediate transfer belt 8), a housing (e.g., the frame housing 80), a grip (e.g., the handle 124), and a cover (e.g., the inner cover 90). The housing supports at least multiple stretching rollers (e.g., the driven roller 10, the driving roller 11) for stretching the intermediate transfer belt. The grip that is gripped by an operator such as a serviceman when the intermediate transfer unit is pulled out is disposed in a downstream plate (e.g., the front plate 120*a*, the front plate 120*b*) of the housing orthogonal to the pull-out direction on the downstream side in the pull-out direction in the intermediate transfer unit 7 removably attached to a body of an image forming apparatus. The cover covers the downstream plate. The cover has a hole (e.g., the hole 91*a*) for the operator to access the grip. Various mechanisms and members such as a stretching roller (e.g., the driven roller 10, the driving roller 11) for stretching the intermediate transfer belt, a tensioner (e.g., the tensioner 160) for applying tension to the intermediate transfer belt, a driving unit for driving to rotate the intermediate transfer belt, and a belt cleaning mechanism for cleaning the surface of the intermediate transfer belt are supported by the housing of the intermediate transfer unit. The housing has high rigidity so that the housing is not deformed even when the housing supports the above-described mechanisms and members. The grip to be gripped by an operator such as a serviceman when the intermediate transfer unit is pulled out from the body of the image forming apparatus is disposed in the casing having high rigidity, so that deformation of the intermediate transfer unit when the intermediate transfer unit is pulled out is restricted. A member such as a motor included in the mechanism supported by the housing may be attached to the surface of the downstream side plate such as the front plate of the housing on which the grip is disposed, or a part of the mechanism or a part of the member may penetrate the downstream side plate and protrude from the surface on which the grip is disposed. Accordingly, for example, when a user removes a jammed sheet from a sheet conveyance passage disposed below the intermediate transfer unit through an opening of the image forming apparatus body from which the intermediate transfer unit is pulled out for jam processing, the user may inadvertently touch a member included in a mechanism supported on a surface on which the grip of the intermediate transfer unit mounted on the apparatus body is disposed, or a mechanism or a member protruding from the surface on which the grip is disposed. On the other hand, in the first aspect, the downstream side plate of the housing is covered with the cover, so that a member included in the mechanism supported by the housing attached to the surface of the downstream side plate on which the grip is disposed, and a part of the mechanism and a part of the member which penetrate the downstream side plate and protrude from the surface on which the grip is disposed are covered with the cover. Such a configuration can prevent a user from carelessly touching a member included in a mechanism supported by the housing attached to the surface of the downstream side plate on which the grip is disposed, or a part of the mechanism or a part of the member which penetrates the downstream side plate and protrudes from the surface on which the grip is disposed. The cover has the hole for an operator such as a serviceman to access the grip disposed on the downstream side plate, so that the operator can access the grip and pull out the intermediate transfer unit from the body of the image forming apparatus without removing the cover. Such a configuration can simplify the operation of pulling out the intermediate transfer unit from the body of the image forming apparatus.

Second Aspect

In the intermediate transfer unit (e.g., the intermediate transfer unit 7) according to the first aspect, both ends of the downstream side plate (in the present embodiment, the downstream side plate includes the front frame 82 and the pair of front plates 120) are fastened to the body of the image forming apparatus by fasteners (e.g., the screws 125). The cover (e.g., the inner cover 90) has a fall prevention portion (e.g., the screw guide hole 92) that prevents the fasteners from falling when the fastening to the body of the image forming apparatus is released. As described above in the embodiment, such a configuration can prevent the fastener (e.g., the screw 125) from falling into the body of the image forming apparatus.

Third Aspect

The intermediate transfer unit (e.g., the intermediate transfer unit 7) according to the first or second aspect further includes a tensioner (e.g., the tensioner 160) that applies tension to the intermediate transfer belt (e.g., the intermediate transfer belt 8). The tensioner is removable from the housing (e.g., the frame housing 80) without removing the cover (e.g., the inner cover 90). As described above in the embodiment, such a configuration can replace, for example, the stretching rollers without removing the cover (e.g., the inner cover 90) and simplify the maintenance work of the intermediate transfer unit.

Fourth Aspect

The intermediate transfer unit (e.g., the intermediate transfer unit 7) according to any one of the first to fourth aspects further includes a detachable unit (e.g., the lubricant applying device 200, the belt cleaner 100) detachable from the intermediate transfer unit 7, and includes an opening-and-closing member (e.g., the small transfer door 70) rotatable between a passage closing position for closing a detachable passage of the detachable unit and a passage opening position for opening the detachable passage. With such a configuration, as described above in the embodiment, the detachable unit (e.g., the lubricant applying device 200, the belt cleaner 100) that is attachable to and detachable from the intermediate transfer unit (e.g., the intermediate transfer unit 7) can be attached to and detached from without removing the cover such as the inner cover (e.g., the inner cover 90).

Fifth Aspect

The intermediate transfer unit (e.g., the intermediate transfer unit 7) according to the fourth aspect further includes the tensioner (e.g., the tensioner 160) that applies tension to the intermediate transfer belt (e.g., the intermediate transfer belt 8). The tensioner includes a guide (e.g., the guide 165) that guides attachment and detachment of the detachable unit (e.g., the lubricant applying device 200, the belt cleaner 100). With such a configuration, as described above in the embodiment, the detachable unit (e.g., the lubricant applying device 200, the belt cleaner 100) can be easily attached to and detached from the intermediate transfer unit (e.g., the intermediate transfer unit 7).

Sixth Aspect

An image forming apparatus includes the intermediate transfer unit (e.g., the intermediate transfer unit 7) according to any one of the first to fifth aspects. According to this configuration, the maintenance work of the intermediate transfer unit can be simplified.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An intermediate transfer unit comprising:
an intermediate transfer belt;
a housing that supports a plurality of stretching rollers stretching the intermediate transfer belt, the housing having a downstream plate in a pull-out direction of the intermediate transfer unit, the downstream plate being orthogonal to the pull-out direction;
a grip on the downstream plate; and
a cover to cover the downstream plate, the cover having a hole to access the grip.

2. The intermediate transfer unit according to claim 1, further comprising a fastener fastening both ends of the downstream plate to a body of an image forming apparatus,
wherein the cover has a fall prevention portion to prevent the fastener from falling when fastening of the downstream plate and the body of the image forming apparatus is released.

3. The intermediate transfer unit according to claim 1, further comprising a tensioner to apply tension to the intermediate transfer belt,
wherein the tensioner is removable from the housing without removing the cover.

4. The intermediate transfer unit according to claim 1, further comprising:
a detachable unit attachable to and detachable from the intermediate transfer unit; and
an opening-and-closing member rotatable between a passage closing position for closing a passage in which the detachable unit is attached to and detached from the intermediate transfer belt and a passage opening position for opening the passage.

5. The intermediate transfer unit according to claim 4, further comprising a tensioner to apply tension to the intermediate transfer belt,
wherein the tensioner includes a guide to guide attachment and detachment of the detachable unit to and from the intermediate transfer unit.

6. An image forming apparatus comprising the intermediate transfer unit according to claim 1.

* * * * *